United States Patent [19]

Suzuki

[11] Patent Number: 4,942,600
[45] Date of Patent: Jul. 17, 1990

[54] COMMUNICATION APPARATUS FOR GENERATING A CALL SIGNAL FROM A TELEPHONE SET TO A DATA TERMINAL

[75] Inventor: Shoji Suzuki, Atsugi, Japan

[73] Assignee: Canon Kabushiki Kaisha, Tokyo, Japan

[21] Appl. No.: 319,053

[22] Filed: Mar. 6, 1989

[30] Foreign Application Priority Data

Mar. 7, 1988 [JP] Japan .................................. 63-053172
Mar. 15, 1988 [JP] Japan .................................. 63-059246
Jun. 20, 1988 [JP] Japan .................................. 63-150197

[51] Int. Cl.$^5$ ........................................ H04M 11/08
[52] U.S. Cl. .................................... 379/100; 379/350; 379/418
[58] Field of Search ............... 379/100, 164, 373, 375, 379/350, 352, 418

[56] References Cited

U.S. PATENT DOCUMENTS 4,660,218 4/1987 Hashimoto ..................... 379/100 X Primary Examiner—Stafford D. Schreyer
Attorney, Agent, or Firm—Fitzpatrick, Cella, Harper & Scinto

[57] ABSTRACT

A call signal generating circuit includes a DC/DC converter, an ON/OFF control unit, including a control circuit and a phototransistor, for ON/OFF-controlling an output voltage from the DC/DC converter, and a polarity inverter cooperating with the control circuit, for switching polarities of an ON/OFF-controlled voltage. The ON/OFF timings of the ON/OFF control unit and a polarity switching timing of the polarity inverter are adjusted to generate a call signal having an arbitrary frequency.

22 Claims, 12 Drawing Sheets

FIG. 3 PRIOR ART
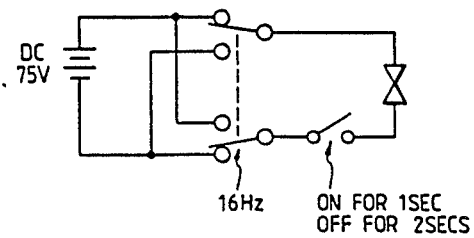
FIG. 4 PRIOR ART
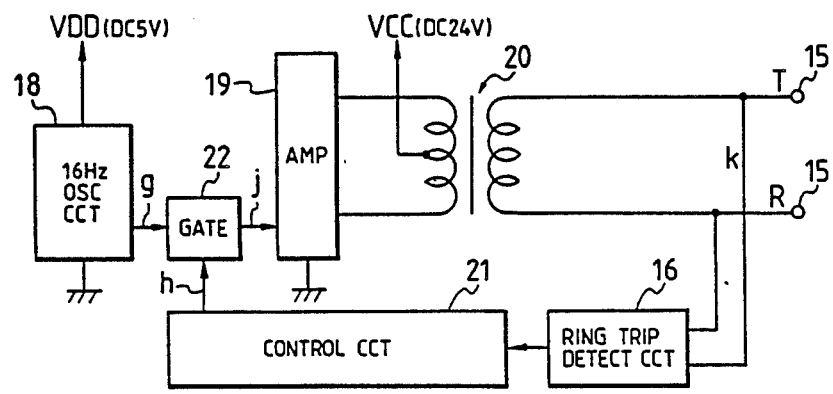
FIG.5g PRIOR ART
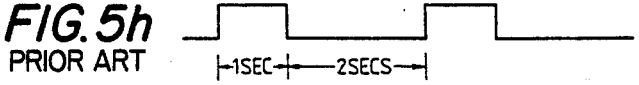
FIG.5h PRIOR ART
FIG.5j PRIOR ART
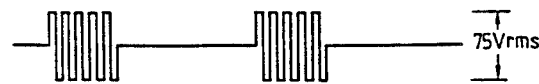
FIG.5k PRIOR ART

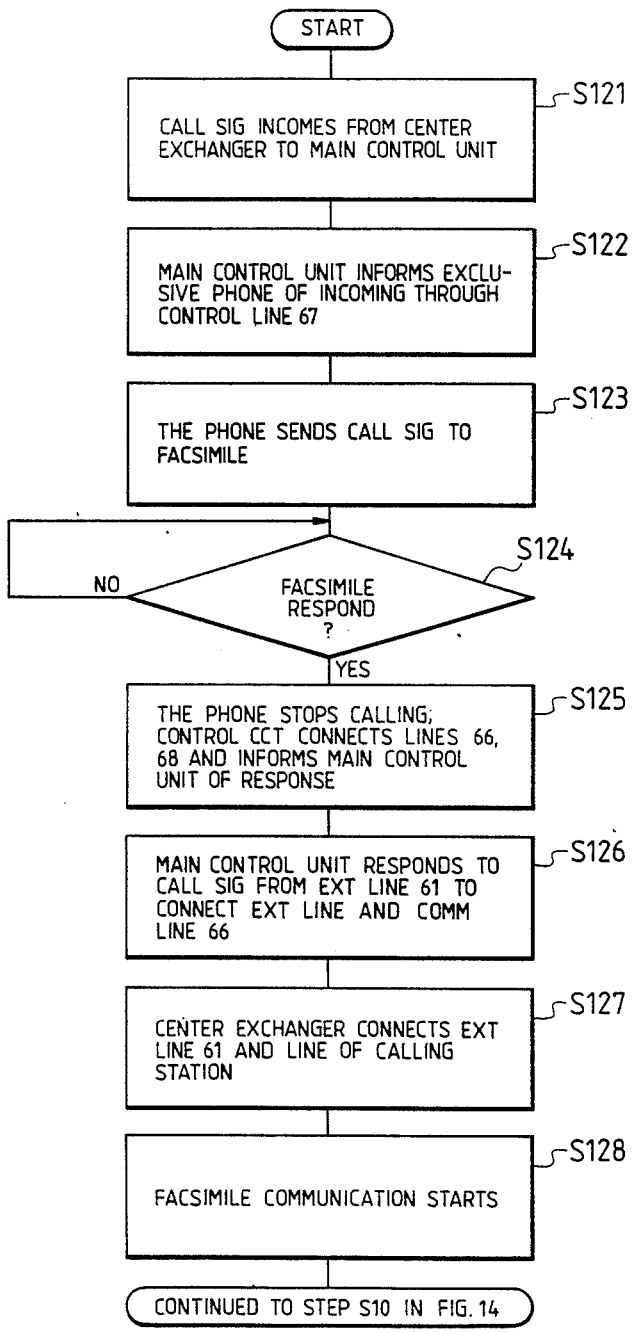

COMMUNICATION APPARATUS FOR GENERATING A CALL SIGNAL FROM A TELEPHONE SET TO A DATA TERMINAL

BACKGROUND OF THE INVENTION:

1. Field of the Invention

The present invention relates to a communication apparatus having a function for generating a call signal or a communication apparatus to which another terminal can be connected.

1. Related Background Art

An INT or IR signal (repetition of ON for one second and OFF for two seconds) for interrupting a voltage of 75 V (16 Hz) is used as a call signal for ringing a bell of a telephone set. FIG. 3 is a circuit diagram showing a principle for ringing a bell of a telephone set.

FIG. 4 is a diagram showing a conventional signal generating circuit for ringing a bell of a telephone set.

This conventional signal generating circuit comprises a 16-Hz oscillator 18, an amplifier 19, a control circuit 21, a gate 22 enabled/disabled in response to a control signal from the control circuit 21, an output transformer 20 for boosting an output from the amplifier 19, and a ring trip detect circuit 16 for monitoring whether output terminals 15-T and 15-R connected to a telephone set are engaged by a DC circuit. The ring trip detect circuit 16 is a circuit for detecting a DC loop formed during transmission of a 16-Hz call signal (one second). The detect circuit 16 integrates signals at the output terminals 15-T and 15-R and detects formation of a DC loop by determining a level of an integrated signal.

In the conventional signal generating circuit, in order to ring a bell of a telephone set connected to the output terminals 15T and 15R, a control signal shown in FIG. 5(h) is supplied from the control circuit 21 to the gate 22. An output signal from the gate 22 is shown in FIG. 5(j). This signal is amplified by the amplifier 19, thereby obtaining an amplified signal shown in FIG. 5(k). The amplified signal is supplied to the boosting transformer 20 and the output terminals 15-T and 15-R, thereby ringing the bell of the telephone set.

When a called party pickes up a handset of the telephone set, a DC circuit is formed. This DC circuit is detected by the ring trip detect circuit 16. A detection signal from the ring trip detect circuit 16 is supplied to the control circuit 21. The control circuit 21 stops generating the control signal supplied to the gate 22, and therefore the bell stops ringing.

In the conventional arrangement, since the boosting transformer 20 is used at a low frequency of 16 Hz, utilization efficiency of the power source is poor. In addition, in order to reduce a loss of the boosting transformer 20, the boosting transformer becomes bulky. As a result, the boosting transformer is expensive, and the mounting volume of the call signal generating circuit is undesirably increased.

Telephone lines have been used for data communication of a facsimile machine and a teletex in addition to speech communication. A switching relay is arranged in a conventional facsimile machine to selectively connect a telephone set and the facsimile machine to the telephone line. The switching relay is switched under the control of a controller. In an automatic reception mode, when a call signal is received from a telephone line, the line is automatically switched from the telephone set to the facsimile machine to receive an image signal.

The present applicant proposed a communication system for connecting the above-mentioned facsimile machine to a telephone set for exclusive use in a key telephone system in U.S. patent application Ser. No. 270,208. In this USSN, a call signal generating circuit and a ring trip detect circuit shown in FIG. 4 are arranged in the telephone set for exclusive use to automatically start the facsimile machine. However in this case, high-breakdown electronic components must be used in the call signal generating circuit and the ring trip detect circuit, as described above.

In addition, generation of a dummy call signal and dummy response detection of the facsimile machine by ring trip detection must be performed. As a result, control procedures are undesirably complicated.

In U.S. Ser. No. 270,208, the following procedures must be performed when a facsimile communication destination is called from a telephone set for exclusive use by using its dialing function. A basic arrangement of the system shown in U.S. Ser. No. 270,208 is shown in FIG. 6.

(1) A handset of a telephone set 63 for exclusive use is set in an off-hook state to form a DC loop of a speech communication line 66 and an external line 61.

(2) A telephone number of a destination to be called (speech communication destination) is input with telephone number buttons of the telephone set for exclusive use and is sent out onto the external line 61.

(3) When a response of the destination facsimile machine is confirmed, the telephone set for exclusive use is operated to form a speech communication path by connecting the speech communication line 66 and a speech communication line 68 upon formation of a DC loop of the speech communication line 68 for connecting the telephone set for exclusive us and the facsimile machine.

(4) When the handset of a telephone set 65 for general use is set in an off-hook state and a start button of a facsimile machine 64 is depressed, a DC loop is formed in the speech communication line 68. Therefore, the speech communication line 66 is connected to the speech communication line 68 to set a facsimile communicable state.

(5) Facsimile communication is performed between the facsimile machines.

The above system, however, poses the following problems to be solved.

(1) Both the telephone set 63 for exclusive use and the telephone set 65 for general use must be prepared.

(2) Unless the handset of the telephone set for general use is set in the off-hook state upon switching with the telephone set 63 for exclusive use, the start button of the facsimile machine 64 cannot be operated, thus inevitably requiring complicated procedures.

SUMMARY OF THE INVENTION

It is an object of the present invention to solve the conventional problems described above and to improve a communication apparatus.

It is another object of the present invention to provide a communication apparatus capable of generating a call signal with a simple arrangement.

It is still another object of the present invention to simplify an arrangement when a call signal is sent to a data communication apparatus to start it.

It is still another object of the present invention to simplify a system arrangement in a communication system for connecting a transmission line to a data communication apparatus through a communication apparatus.

It is still another object of the present invention to simplify procedures for connecting a transmission line to a data communication apparatus in a communication system for connecting the transmission line to the data communication apparatus through the communication apparatus.

The above and other objects, features, and advantages of the present invention will be apparent from the detailed description of preferred embodiments in conjunction with the accompanying drawings.

BRIEF DESCRIPTION OF THE DRAWINGS

FIG. 3 is a circuit diagram showing a principle for ringing a bell in a telephone set;

FIG. 4 is a circuit diagram showing a conventional signal generating circuit;

FIGS. 5(g) to 5(k) are timing charts showing signal waveforms of the main parts in the circuit in FIG. 4;

FIG. 17 is a flow chart showing operations in call signal incoming operation.

DETAILED DESCRIPTION OF THE PREFERRED EMBODIMENTS

Preferred embodiments of the present invention will be described in detail with reference to the accompanying drawings.

A call signal generating circuit according to a first embodiment will be described below.

Figure 1:
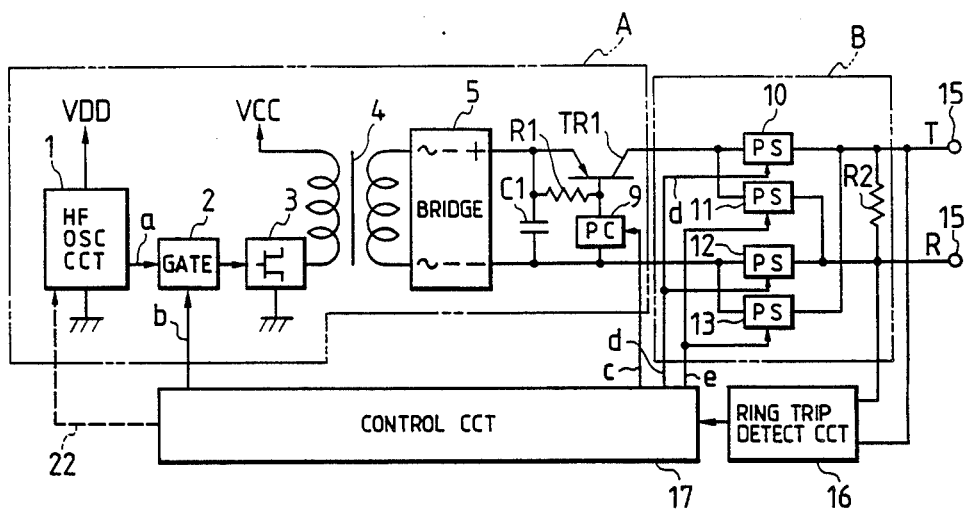
FIG. 1 is a block diagram showing an arrangement of a call signal generating circuit according to a first embodiment of the present invention.

FIG. 1 is a block diagram showing an arrangement of the call signal generating circuit of the first embodiment. The call signal generating circuit in FIG. 1 comprises a DC/DC converter A, a polarity inverter B, a ring trip detect circuit 16, and a control circuit 17.

The DC/DC converter A comprises a high-frequency oscillation (HF OSC) circuit 1 for normally generating a signal having a frequency of 10 to 100 kHz, a gate 2 for turning on/off an output signal from the high-frequency oscillation circuit 1, a switching element 3 of a bipolar transistor, an FET, or the like, a boosting transformer 4, a rectifying stack 5, a smoothing capacitor C1, a transistor TR1, a bias resistor R1 for this transistor TR1, and a phototransistor coupler 9.

The polarity inverter B comprises photothyristor couplers 10, 11, 12, and 13, and a resistor R2.

The control circuit 17 and the gate 2 constitute an ON/OFF control means for controlling ON (one second) and OFF (two seconds) times of an output voltage from the DC/DC converter A. The control circuit 17 and the phototransistor 9 constitute a means for controlling ON and OFF times of the ON-controlled voltage at 16 Hz. The control circuit 17 and the photothyristor couplers 10, 11, 12, and 13 constitute a means for alternately inverting the polarities of the ON/OFF-controlled voltage. Note that the control circuit 17 comprises a microcomputer, a ROM, a RAM, and the like.

An operation of the call signal generating circuit shown in FIG. 1 will be described below.

FIG. 2(a) to 2(f) are timing charts of the signal waveforms of the main parts in the circuit shown in FIG. 1. More specifically, FIGS. 2(a) to 2(f) show signal waveforms indicated by portions a to f in FIG. 1, respectively.

Figure 2A:
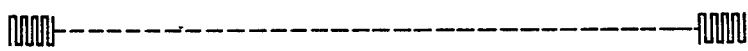
FIGS. 2(a) to 2(f) are timing charts showing signal waveforms of the main parts in FIG. 1.

The high-frequency oscillation circuit 1 outputs a high-frequency signal shown in FIG. 2(a). The control circuit 17 outputs a control signal shown in FIG. 2(b) to the gate 2. During the ON time of this control signal, the high-frequency signal drives the switching element 3 and switches the VCC (DC 24 to 48 V) through the boosting transformer 4. Therefore, a high-frequency voltage of about 75 V is induced at the secondary winding of the transformer 4.

The high-frequency voltage of about 75 V is rectified by the rectifying stack 5 and smoothed by the capacitor C1, thereby obtaining a high DC voltage (about 75 V). The control circuit 17 controls the photocoupler 9 and outputs a high voltage (about 75 V) at a timing when the transistor TR1 is turned on/off by the photocoupler 9.

Figure 2B:
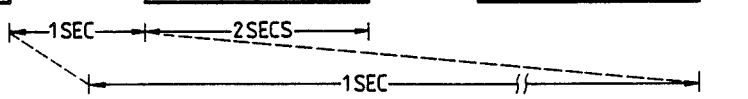
Figure 2C:
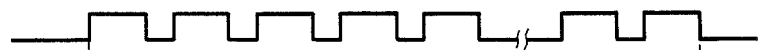
Figure 2D:
Figure 2E:
Figure 2F:

The control circuit 17 turns on/off the photothyristor couplers 10 to 13 at timings shown in FIGS. 2(d) and 2(e) and generates an AC signal (signal in FIG. 2(f)) whose polarities are alternately inverted at a period of 16 Hz. This AC signal is used to ring the bell of the telephone set.

The resistance of the resistor R2 is determined to cause the ring trip detect circuit 16 not to detect a DC loop when the handset of the telephone set is not set in an off-hook state or when the DC loop is not formed in a data communication apparatus such as a facsimile machine, but to sufficiently detect the DC loop when the handset of the telephone set is set in the off-hook state. When the ring trip detect circuit 16 detects a ring trip, the control circuit 17 stops the above operation to interrupt ringing of the bell of the telephone set.

In the arrangement of FIG. 1, the photothyristor couplers 10 to 13 are used to convert a high DC voltage into an AC voltage. However, in place of the couplers 10 to 13, another switching element such as a relay, a transistor, or a triac may be used. In addition, a switching element (e.g., an FET or a bipolar transistor) through which little leak current flows may be used in place of the coupler. In this case, the high voltage need not be turned on/off by the transistor TR1.

In the arrangement of FIG. 1, the transistor TR1 turns on/off the high DC voltage on the secondary side of the transformer 4 to block a continuous flow of current through thyristor couplers 10 to 13. However, the transistor TR1 may turns on/off the high DC voltage on the primary side of the transformer 4.

Furthermore, the frequency of the signal from the high-frequency oscillation circuit 1, the value of the VCC, the boosting ratio of the transformer 4, and the frequency of the signal for ringing the bell may be arbitrarily selected.

According to the call signal generating circuit as described above, utilization efficiency of the power source can be improved, and the circuit size can be made compact.

An arrangement including the above-mentioned call signal generating circuit in a telephone set which sends out a call signal to a facsimile machine and has a function for switching a transmission line to the facsimile machine will be described as a second embodiment of the present invention.

Figure 7:
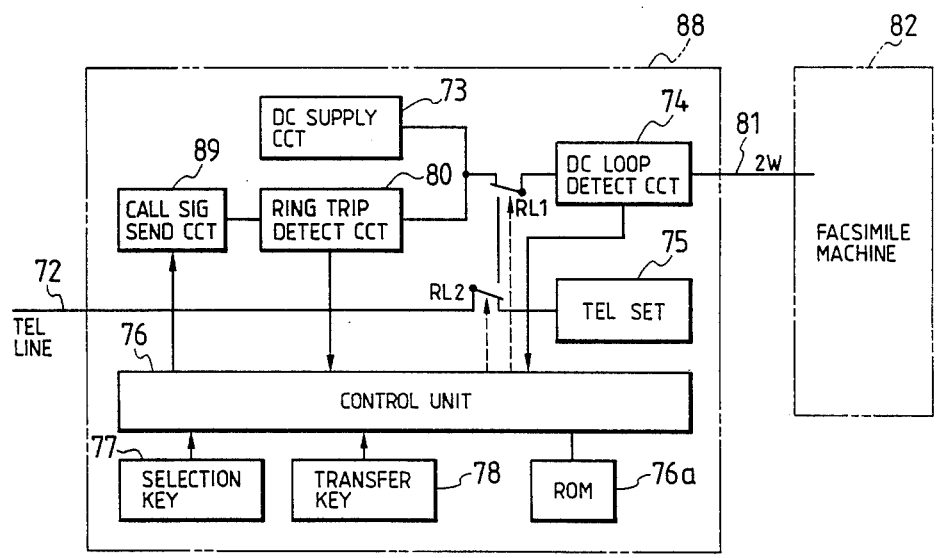
FIG. 7 is a block diagram showing an arrangement of a communication apparatus according to a second embodiment of the present invention.

FIG. 7 is a block diagram showing an arrangement of the telephone set of the second embodiment.

Referring to FIG. 7, this arrangement includes a telephone set 75 for general use, and a facsimile machine 82 as an apparatus for performing communication except for speech communication. Switching between the telephone set 75 and the facsimile machine 82 is performed by a switching unit 88. The switching unit 88 may be arranged in the telephone set 75, but must be located at least near the telephone set 75, so that the user can manually switch the line connection.

Whether a telephone line 72 is connected to the telephone set 75 or the facsimile machine 82 is controlled by two relays RL1 and RL2. The control contact of the relay RL2 is connected to the telephone line 72, and the telephone set 75 is connected to one of the contacts of the relay RL2.

The other contact of the relay RL2 is connected to one of the contacts of the relay RL1. The control contact of the relay RL1 is connected to a two-wire signal line 81 between the telephone set and the facsimile machine 82 through a DC loop detect circuit 74 for detecting a call operation of the facsimile machine 82.

The other contact of the relay RL1 is connected a DC supply circuit 73 for forming a dummy and a series circuit of a call signal send circuit 89 for sending a dummy call signal to the facsimile machine 82 and a ring trip detect circuit 80 for detecting a response of the facsimile machine 82.

An operation of the above circuit arrangement is controlled by a control unit 76 including a microprocessor or the like. The control procedures of the control unit 76 are stored in a ROM 76a.

The switching unit 88 has two modes of operation. More specifically, the first mode is a mode for normally connecting the facsimile machine 82 to the telephone line 72 to usually perform facsimile communication by utilizing an automatic outgoing/incoming call operation of the facsimile machine 82. The second mode is a mode for performing an incoming call operation by the telephone set 75 and switching the line at the time of communication for the facsimile machine 82 since the telephone line 72 is commonly used by the telephone set 75 and the facsimile machine 82.

This mode switching is performed by a selection key 77. A transfer key 78 is arranged to transfer a call to the facsimile machine 82 since the incoming mode is set to always receive a call to the telephone set 75.

An operation of the above arrangement will be described below. When the automatic communication mode of the facsimile machine 82 is set by the selection key 77, the relays RL1 and RL2 are connected to the lower and upper contacts, respectively, so that the facsimile machine 82 is directly connected to the telephone line 72.

Figure 8:
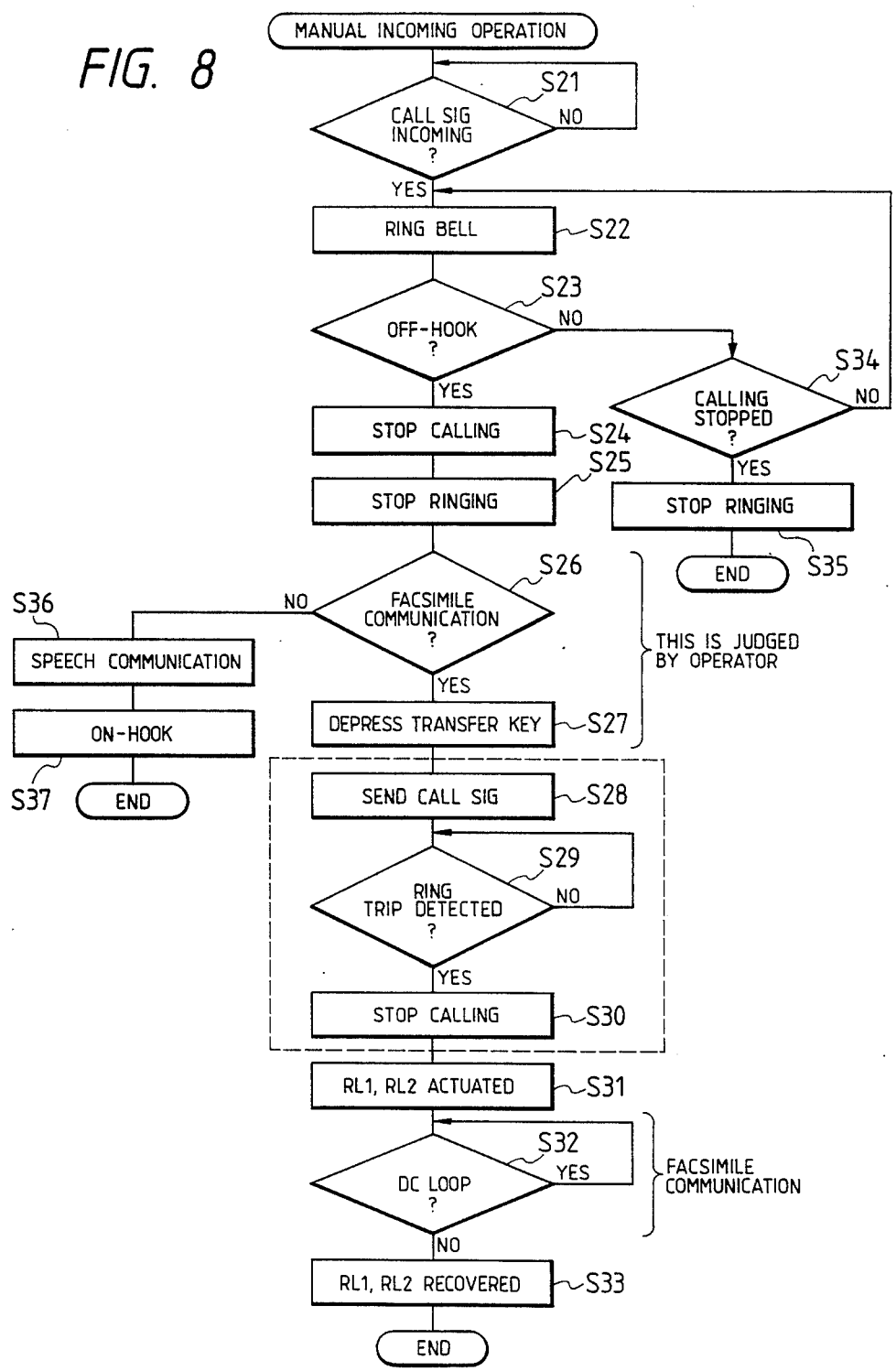
FIG. 8 is a flow chart showing control operations of a control, unit 76 in the second embodiment.

However, when a manual incoming call operation of the telephone set 75 is performed by the selection key 77, the control procedures shown in FIG. 8 are performed by the control unit 76. These procedures are stored in the ROM 76a.

In this mode, the relay RL2 is connected to the telephone set 75. When a call signal is sent from the telephone line 72 in step S21 of FIG. 8, the bell of the telephone set 75 is rung in step S22.

When the telephone set 75 is not set in the off-hook state in step S23, the bell is kept rung until disabling of the call signal is detected in step S34. When the telephone set 75 is set in an on-hook state, i.e., no one answers the telephone, the calling station stops generating the call signal in step S34, and then the bell stops ringing in step S35.

When the telephone set 75 is set in the off-hook state, i.e., when someone answers the telephone, the flow advances to step S24. The call signal on the telephone line is disabled in step S24, and ringing of the bell of the telephone set 75 is stopped in step S25. The called party listens to signal tones from the calling party in step S26 and judges whether the calling party wishes facsimile communication. If the calling station is not a facsimile machine, speech communication is performed in step S36. Communication is then ended by the on-hook operation in step S37.

When the calling station is a facsimile machine, the operator depresses the transfer key 78 in step S27, and then a call signal send routine in step S28 is executed. After the control unit 76 connects the relay RL1 to the upper contact (FIG. 7) and causes the call signal send circuit 89 to output to the facsimile machine 82 through the ring trip detect circuit 80 the same call signal as that sent by the call signal send circuit 89. Therefore, the facsimile machine 82 is called by a dummy call signal.

In step S29, the response of the facsimile machine 82 is monitored by the ring trip detect circuit 80. When the facsimile machine 82 actually responds to the dummy call signal, the control unit 76 stops generating the call signal in step S30.

During the operations in steps S28 to S30 surrounded by a broken line in FIG. 8, the relay RL2 is connected to the telephone set 75, and a DC loop is held by the telephone set 75. When the response of the facsimile machine is detected, the relays RL1 and RL2 are connected to the lower and upper contacts, respectively, in step S31. Therefore, the telephone line 72 is connected to the facsimile machine 22.

Communication through the facsimile machine 22 is started. During facsimile communication, a state of a DC loop is kept monitored by the DC loop detect circuit 74. When the DC loop is released, the control unit 76 detects that the facsimile machine 22 is disconnected from the telephone line. In step S33, the relays RL1 and RL2 are recovered, and the processing is ended.

Figure 9:
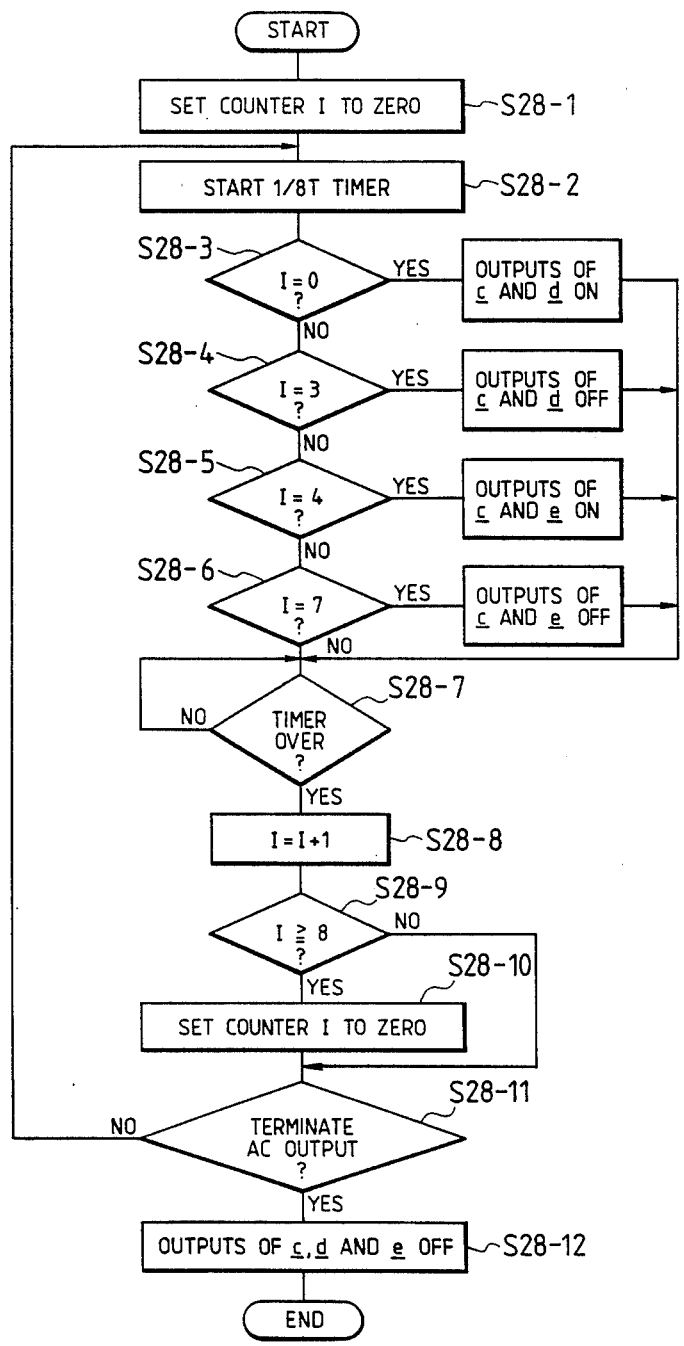
FIG. 9 is a flow chart showing a call signal transmission routine.

FIG. 9 is a flow chart showing the call signal send routine in step S28. The relationship of connection between the control unit 76 and the call signal send circuit 89 (the DC/DC converter A and the polarity inverter B in FIG. 1) is the same as that in FIG. 1.

A call signal send operation will be described with reference to the flow chart in FIG. 9.

In this operation, an AC output voltage has a period T, and this period is divided into eight time slots. The outputs c, d, and e (FIG. 1) are ON/OFF-controlled at timings 3T/8, T/8, 3T/8, and T/8. In step S28-1, a counter I is set to 0. In step S28-2, a T/8 timer is started. The outputs c, d, and e are ON/OFF-controlled by the counts of the T/8 counter in steps S28-3 to S28-6. In step S28-7, the control unit 76 waits until the timer is over. When the timer is over, the counter value is incremented in step S28-8. When the counter value becomes 8 in step S28-9, the counter value is set to 0 again in step S28-10. The control unit 76 determines in step S28-11 whether the AC output is stopped due to the end of ringing internal of the bell or ring trip detection. When the AC output is kept generated, the flow advances to step S28-2. Otherwise, the flow is branched into step S28-12. The outputs c, d, and e are disabled, and the flow is ended. Therefore, the call signal shown in FIG. 2(f) is generated. Note that T = 1/16 Hz in FIG. 2(f).

Referring to FIG. 9, the timer is a programmable timer, and the period T can be arbitrarily set. When the period T is arbitrarily changed, the period of the call signal can be variably set. In general, periods of call signals and their voltage standards vary in various countries. According to this embodiment, the value of the period T can be arbitrarily set, so that different requirements depending on various countries can be easily satisfied.

The control circuit 17 of FIG. 1 (the same as the control unit 76 in FIG. 7) outputs a control signal for controlling a duty ratio to the high-frequency oscillation circuit 1 and the high-frequency oscillation circuit 1 changes a duty ratio of a pulse output from the oscillation circuit 1 in accordance with the control signal. Therefore, the voltage of the call signal can be variably controlled. Software processing of the control circuit 17 can cope with various voltage standard requirements depending on various counties as in the various requirements for the periods.

The arrangement of the call signal generating circuit can be simplified according to the second embodiment.

According to the second embodiment, however, high-breakdown electronic components are required for the call signal send circuit 89 and the ring trip detect circuit 80 in order to generate a 16-Hz, 75-Vrms AC signal as a call signal.

In addition, according to the second embodiment, generation of the dummy call signal and facsimile response by ring trip detection must be performed. Therefore, the control procedures of the control unit 76 are complicated.

A communication apparatus capable of starting communication equipment such as a facsimile machine without using a high-voltage, low-frequency call signal will be described according to a third embodiment of the present invention below.

Figure 10:
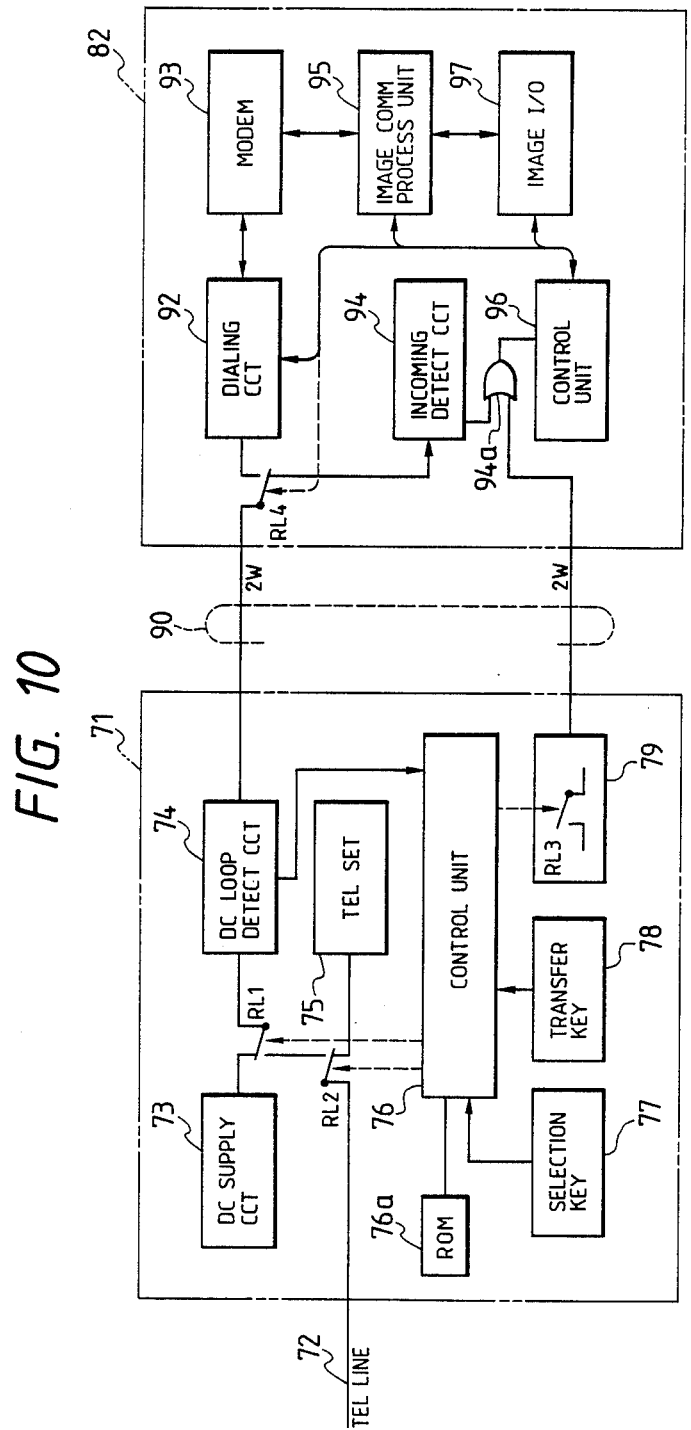
FIG. 10 is a block diagram showing an arrangement of a communication apparatus according to a third embodiment of the present invention.

FIG. 10 is a block diagram showing an arrangement of a communication apparatus according to the third embodiment.

A switching unit 71 in FIG. 10 corresponds to the switching unit 88 in FIG. 7. The switching unit 71 does not include a call signal send circuit 89 and a ring trip detect circuit 80. Instead, a relay 79 (RL3) for performing incoming call transfer to a facsimile machine 82' in a manual incoming mode is arranged in the switching unit 71. Other arrangements of the communication apparatus in FIG. 10 are the same as those in FIG. 7. In FIG. 10, a ROM 76a is separated from a control unit 76'. However, the ROM 76a may be arranged in the control unit 76' in the same manner as in FIG. 7.

The facsimile machine 82' has substantially the same arrangement as a conventional facsimile machine. More specifically, the facsimile machine 82' comprises an image I/O unit 97 including a printer and an image scanner, an image communication process unit 95 including a modem, a modem 93, a dialing circuit 92 for automatically calling a desired station, and an incoming detect circuit 94.

The facsimile machine 82' has the same arrangement as the conventional facsimile machine except for the arrangement and operation of the incoming detect circuit 94. The facsimile machine 82' is connected to the switching unit 71 through a four-wire connecting cable 90 unlike in the case of FIG. 7.

The connecting cable 90 comprises a known cable having modular jacks at its both ends. Such a cable generally has six wires. Two of the six wires are used to connect the switching unit 71 to the DC loop detect circuit 74 and a relay RL4 in the facsimile machine 82'. Other two wires are used to control the contacts of the relay 79 in the switching unit 71.

The relay RL4 is used to switch an incoming/outgoing state of the facsimile machine 82' and connects the DC loop detect circuit 74 in the switching unit 71 to the dialing circuit 92 or the incoming detect circuit 94. In a normal automatic incoming state, the relay RL4 is connected to the incoming detect circuit 94. When a call command is input from the facsimile machine by a predetermined operation, the relay RL4 is connected to the dialing circuit 92.

The incoming detect circuit 94 in the facsimile machine 82' detects a call signal input through the relay RL4. The incoming detect circuit 94 includes a capacitor for extracting only an AC component of the transmission line, a photocoupler for detecting a 16-Hz call signal, and a monostable multivibrator for converting a photocoupler output to a pulse signal having a predetermined pulse width in accordance with a predetermined logic value. The incoming detect circuit 94 outputs a pulse signal upon detection of the call signal. The detection pulse signal is input to the control unit 96 in the facsimile machine 82' through an OR gate 94a. The OR gate 94a simultaneously receives a contact signal input through the cable 90. More specifically, electrical connections are made such that one contact is pulled up to the power source voltage, and this voltage level is supplied to the OR gate 94a in accordance with the ON/OFF operation of the contact.

The incoming state can be signaled to the facsimile machine 82' in accordance with the contact states of the relay RL3 without generating a low-frequency, high-voltage call signal from the switching unit 71.

An operation of the apparatus having the above arrangement will be described in detail.

Figure 11:
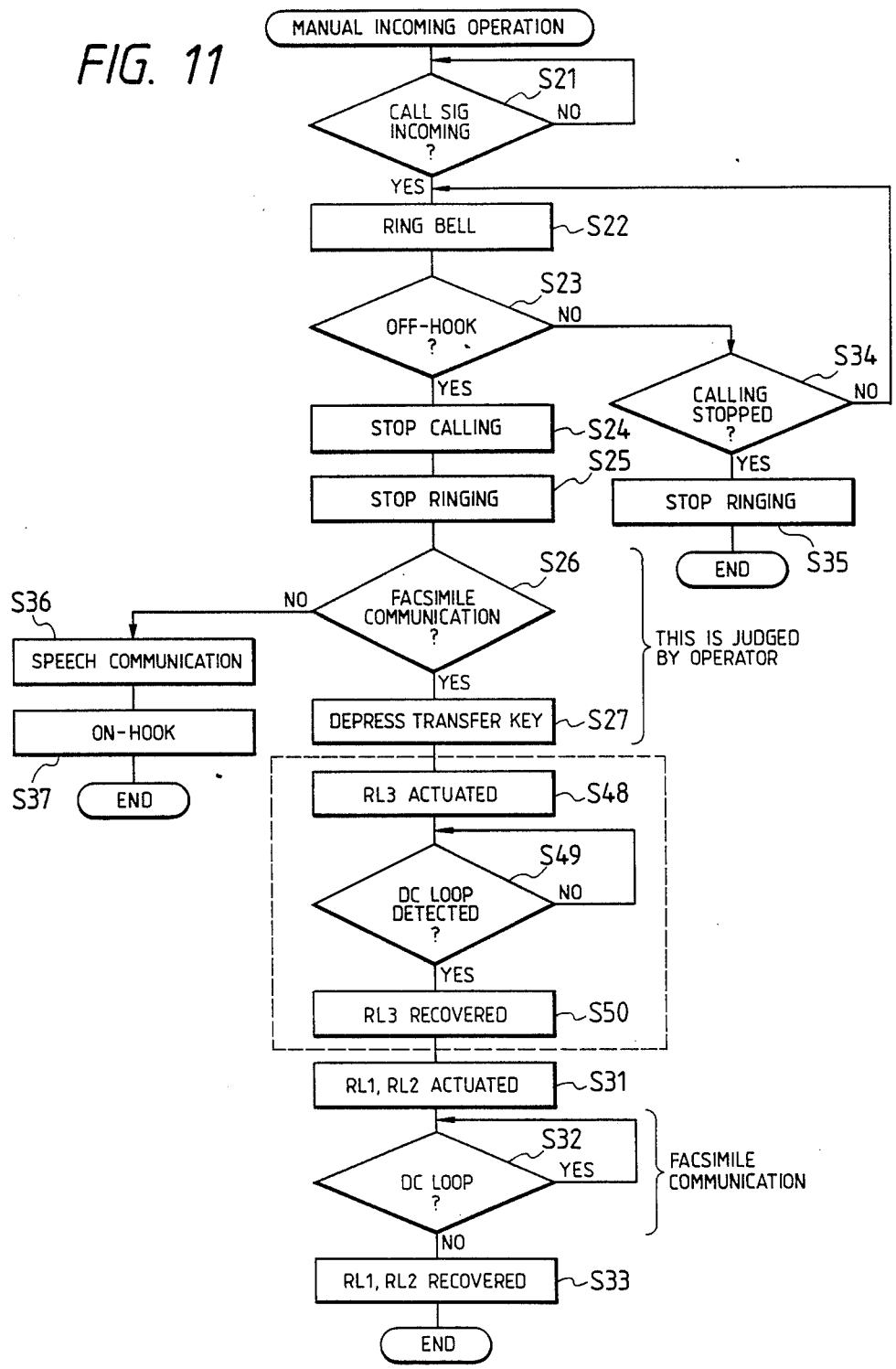
FIG. 11 is a flow chart showing control operations of a control unit 76' of the third embodiment.

FIG. 11 shows control procedures of the control unit 76' in the switching unit 71. These control procedures are stored in the ROM 76a. Referring to FIG. 11, the same reference symbols as in FIG. 8 denote the same procedures, and a detailed description thereof will be omitted. The procedures in FIG. 11 which are different from those in FIG. 8 are steps S48 to S50 surrounded by a broken line. Steps S48 to S50 correspond to steps S28 to S30 in FIG. 8.

When the switching unit 71 is set in the manual incoming mode, the manual incoming operation by the telephone set 75 is performed in the same manner as in FIG. 8. In step S26, when the operator judges facsimile communication, the operator depresses the transfer key 78 in step S27. The control unit 76' advances to step S48 and operates the relay 79 (RL3).

Upon the operation of the relay 79, the same incoming detection signal as the call signal supplied from the telephone line is supplied to the control unit 96 through the OR gate 94a. The control unit 96 in the facsimile machine 82' starts an incoming call operation. In this case, a DC loop is formed by circuits (not shown) in the facsimile machine 82'. This DC loop is detected by the DC loop detect circuit 74 in step S49.

The control unit 76! advances to step S50 by the DC loop detection signal. The relay 79 is recovered to a normal state, and the flow advances to step S31. The telephone line 72 is connected to the facsimile machine 82' by the relays RL1 and RL2 in the same manner as in the procedures in FIG. 8. Thereafter, facsimile communication is started from step S32.

When an outgoing call is made by the facsimile machine 82', the facsimile machine 82' forms a DC loop upon predetermined key input operations. This DC loop is detected by the DC loop detect circuit 74, and the control unit 76' controls to switch the telephone line 72 to the facsimile machine 82' through the relays RL1 and RL2. The end of communication is determined by the absence of the DC loop as in the conventional detection technique.

When the telephone line is always connected to the facsimile machine 82' by the selection key 77, i.e., when the automatic incoming/outgoing call mode is set, the telephone line 72 is always connected to the facsimile machine 82' through the relay RL1. Even if the operator is out, an automatic facsimile incoming/outgoing call operation can be performed.

As described above, since an incoming call can be signaled to the facsimile machine 82' through the contacts without using the same call signal as that appearing on the telephone line, a process circuit which generates a high-voltage, low-frequency signal can be omitted from the switching unit 71. Therefore, a simple, compact, lightweight apparatus can be obtained. At the same time, the power consumption of the apparatus can be reduced. In addition, the number of high-breakdown elements can be reduced, resulting in low cost.

The facsimile machine 82' is simply modified by adding an OR gate to the incoming detect circuit 94. Therefore, the cost of the facsimile machine 82' is not increased.

In the above embodiment, the incoming call is signaled from the switching unit 71 to the facsimile machine 82' through the contacts However, the incoming signal may be sent using a photocoupler.

When the signal is insulatively sent through the contacts or using the photocoupler, an incoming call detection error caused by common mode noise can be prevented.

In the above embodiment, the telephone lines for the switching unit 71 are those of telephone sets for general use. However, a switching unit 71 may be arranged in a telephone set for exclusive use. In other words, the above arrangement may be applied to part of a PBX (Private Branch Exchange). A communication apparatus except for the telephone set is not limited to a facsimile machine but can be a data terminal.

According to the third embodiment, the communication equipment can be started without using the same high-voltage, low-frequency call signal as that appearing on the telephone line. The circuit for generating the high-voltage, low-frequency signal can be omitted. A simple, low-cost, compact, lightweight apparatus can be obtained. Since the incoming detection signal for starting the communication equipment is insulatively input, an operation error of the communication equipment can be eliminated. In addition, a modification of the communication equipment can be minimized to result in low cost.

A communication apparatus having simple connection procedures and a simple circuit arrangement when a data communication apparatus (e.g., a facsimile machine) is connected to a telephone line through the communication apparatus will be described as a fourth embodiment of the present invention.

Figure 6:
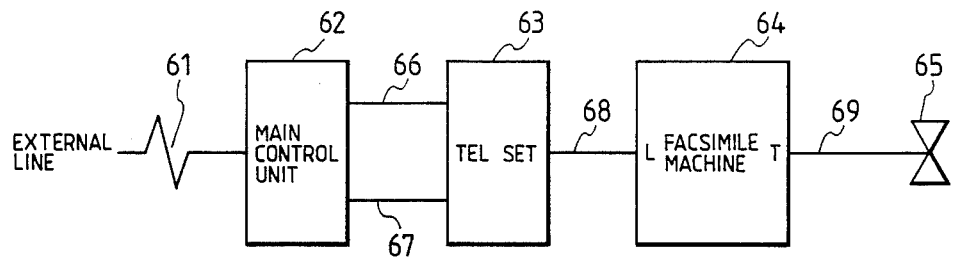
FIG. 6 is a block diagram showing an arrangement in which a facsimile machine is connected to a telephone set for exclusive use in a key telephone system.
Figure 12:
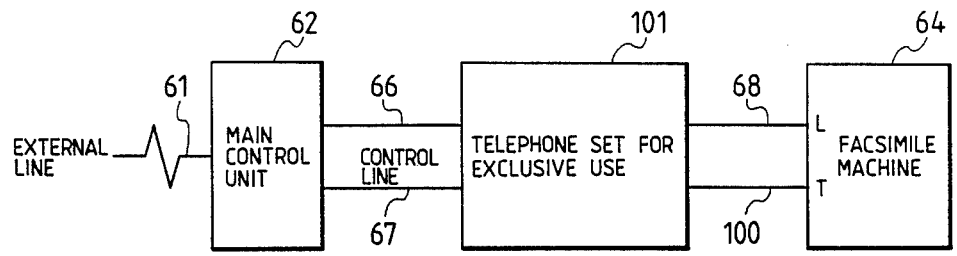
FIG. 12 is a schematic block diagram showing an arrangement of a fourth embodiment of the present invention.

FIG. 12 is a schematic block diagram of the fourth embodiment. The same reference numerals as in FIG. 6 denote the same parts in FIG. 12, and a detailed description thereof will be omitted.

Referring to FIG. 12, this apparatus includes a telephone set 101 for exclusive use as an extension telephone set. An accessory telephone set (telephone set for general use) of a facsimile machine 64 is omitted. A line output terminal (T terminal) for connecting the telephone set 101 and a telephone set 65 of the facsimile machine 64 is connected to the telephone set 101 as if a telephone set for general use is connected when viewed from the facsimile machine 64. More specifically, the T terminal is a two-wire line connection terminal. When the facsimile machine 64 is started, the telephone set 101 forms a DC loop in the connecting lines (DC loop forming lines). The telephone set 101 is a telephone set compatible with a standard interface of a main control unit 62. An exclusive interface need not be required.

The facsimile machine 64 used in this embodiment can be set in a manual/automatic send mode. When the manual send mode is to be set, dialing is performed such that a telephone number is keyed in from an accessory telephone set connected to the facsimile machine 64. In this case, the same dialing operation can be performed by a key-in operation at the telephone set 101 in place of the accessory telephone.

In the automatic send mode, a DC loop with a telephone line 68 is formed to call the telephone set 101. The telephone line 68 is connected to a telephone line 66, and the main control unit 62 connects the telephone line 66 to an external line 61. Therefore, information for the telephone number signal from the facsimile machine 64 is directly sent on the external line 61.

Figure 13:
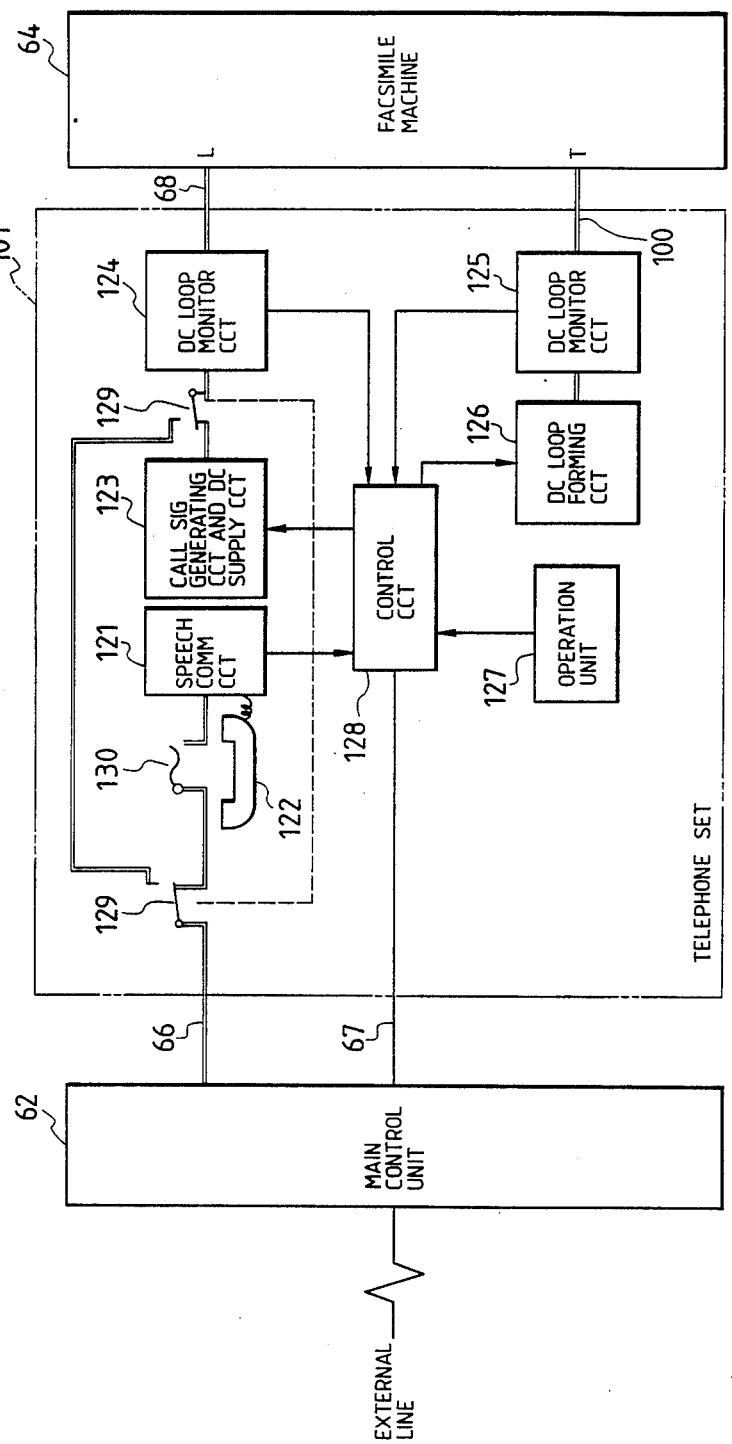
FIG. 13 is a block diagram showing an arrangement of a telephone set for exclusive use according to the fourth embodiment.

A detailed arrangement of the telephone set 101 of the fourth embodiment is shown in FIG. 13.

A speech communication circuit 121 performs impedance matching with the telephone line 66 and sends a speech signal from a handset 122 onto the telephone line 66. At the same time, the speech information from the telephone line 66 is output to the handset 122. A call signal generating circuit and DC supply circuit 123 for outputting a call signal to the facsimile machine 64 and calling the facsimile machine 64 upon reception of facsimile communication, and for supplying a DC power to monitor a DC loop. A DC loop monitor circuit 124 monitors a DC loop with the telephone line 68 during facsimile communication including automatic sending of the facsimile machine 64. A DC loop monitor circuit 125 detects a DC loop with the telephone line 68 which is formed by a DC loop forming circuit 126 or the facsimile machine itself. An operation unit 127 includes telephone number keys, and a selection key for connecting the facsimile machine 64 and the telephone line 66. A control circuit 128 controls the overall telephone operations in accordance with key input operations of the operation unit 127 and control signals from a control line 67.

A relay circuit 129 is operated to switch the telephone line 66 to the speech communication circuit 121 (i.e., the telephone set is used as a telephone set for general use) or the facsimile machine 64. A hook switch 130 detects a on-/off-hook state of the handset 122.

Figure 14:
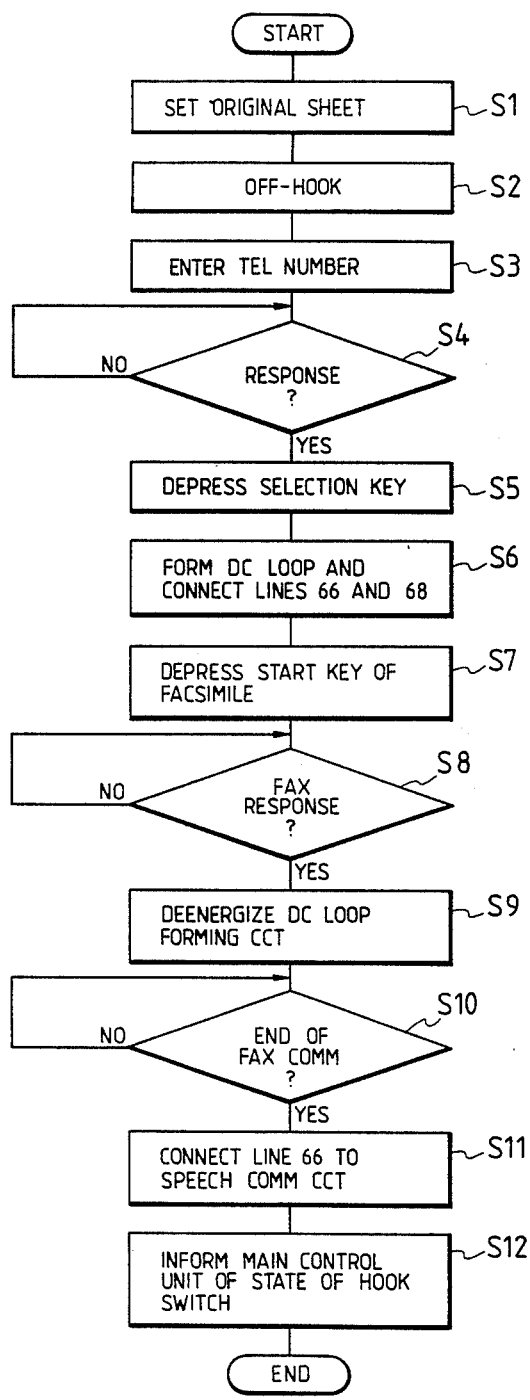
FIG. 14 is a flow chart showing operations of the fourth embodiment.

Facsimile send control of the fourth embodiment having the above arrangement will be described with reference to a flow chart in FIG. 14.

In step S1, an original sheet is set on the facsimile machine 64. The handset 122 is set in the off-hook state in step S2 to form a DC loop with the telephone line 66. The main control unit 62 detects this DC loop and determines that a call request is made from the telephone set 101. The main control unit 62 captures an available subscriber telephone line (external line) to form a DC loop and requests a line connection to an exchanger as telephone network station equipment. When a plurality of external lines are connected to the main control unit 62, one of the external lines is selected by a line selection key or the like in the operation unit 127. Alternatively, a change in state such as an off-hook state of the telephone set 101 may be detected by the control circuit 128, and a detection signal may be sent from the control circuit 128 to the main control unit 62 through the control line 67.

In step S3, a telephone number of the destination facsimile machine is input with telephone number keys on the operation unit 127. Input information from the operation unit 127 is detected by the control circuit 128 and is sent to the main control unit 62 through the control line 67. The main control unit 62 generates a telephone number corresponding to the telephone number key input information sent through the control line 67 and sends it to the captured external line 61. During the series of operations described above, various signal tones from the external line are relayed by the main control unit 62 and can be listened to at the handset 122 of the telephone set 101 through the telephone line 63.

In step S4, the source side waits until the designation apparatus responds. The center exchanger which receives the telephone number signal calls a destination side by selecting a connecting line of a telephone set or an apparatus designated by the telephone number and waits until the destination side responds. When the destination side responds, the main control unit 62 informs the response of the destination side by using the control line 67 and forms a communication path with the designation apparatus, so that the source and designation apparatuses can communicate with each other. The flow advances from step S4 to step S5. A selection key for designating switching of the facsimile machine 64 is depressed at the operation unit 127. When the selection key is depressed, the control circuit 128 operates the DC loop forming circuit 126 in step S6. A DC loop with the T terminal is formed. At the same time, the relay circuit 129 is operated to connect the telephone lines 66 and 68. In this state, the user candepress the start button of the facsimile machine. The user depresses the start button of the facsimile machine as a call request from the accessory telephone (omitted in this embodiment). The facsimile machine is then connected to the line 68.

In step S7, a start key of the facsimile machine 64 is depressed. A DC loop with the line 66 is formed in the facsimile machine 64, so that the facsimile machine 64 is connected to the line 66. For this reason, it is determined in step S8 whether the facsimile machine 64 is disconnected from a DC loop forming line 100 and connected to the telephone line 66. When the DC loop monitor circuit 125 detects a DC loop release upon detection of disconnection of the facsimile machine 64 from the DC loop forming line 100 (when the facsimile machine 64 starts facsimile communication), the flow advances from step S8 to step S9, thereby deenergizing the DC loop forming circuit 126.

Necessary facsimile communication is then performed. When facsimile communication is ended, the facsimile machine 64 releases the DC loop formed with the line 68 so as to open the line. In step S10, the control circuit 28 waits until the DC loop monitor circuit 124 detects a DC loop release. When the DC loop is released and the end of communication is detected, the flow advances to step S11. The relay circuit 129 is recovered, and the line 66 is disconnected from the line 100. The line 66 is connected to the speech communication circuit 121. The control circuit 28 then determines in step S12 whether the hook switch 130 is set in an open state (i.e., the handset is set in an on-hook state) or an off-hook state. The control circuit 28 informs the main control unit 62 of the state of the hook switch 130.

When the on-hook state is detected, the main control unit 62 releases a DC loop formed with the external line and recovers the line. However, when the off-hook state is detected, the main control circuit 62 maintains the speech communication state and recovers the line after the off-hook signal is received from the telephone set 101.

In the above description, the line 66 is normally connected to the speech communication circuit 121. Manual calling and facsimile transmission by using the telephone set for exclusive use are exemplified. However, the present invention is not limited to the particular embodiment described above. The telephone line 66 may be normally connected to the telephone line 68, and the line 66 may be connected to the facsimile machine 64. In this case, the facsimile machine 64 can be set in an automatic/manual receive mode.

Alternatively, the DC loop monitor circuit 125 is normally biased to immediately connect the lines 66 and 68 when a DC loop is formed by the line 68 connected to the facsimile machine 64.

Switching control of the telephone set for exclusive use described above is performed by the separate main control unit 62. When the number of external lines is one, the main control unit need not be arranged as an independent unit. A facsimile adapter with a telephone set need only include a network control circuit for performing network control between the internal circuit arrangement of the telephone set and the external line. In this case, line control from the telephone set to the facsimile machine 64 can be performed with only operations at the telephone set.

Figure 15:
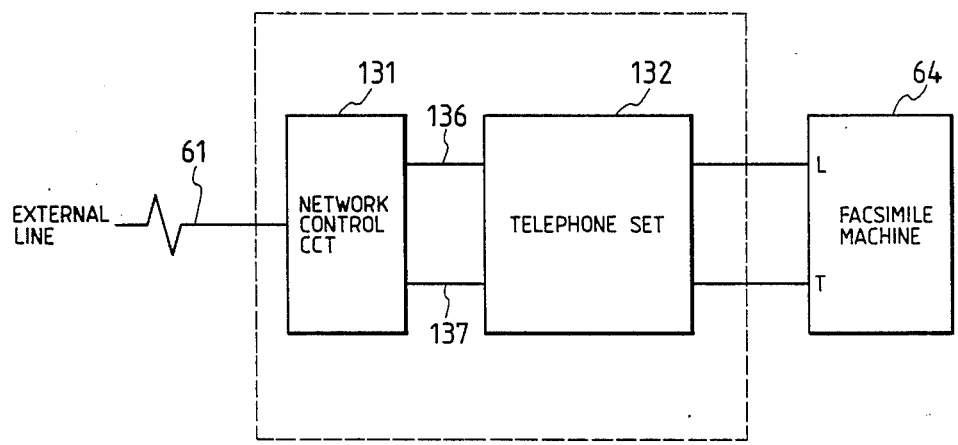
FIG. 15 is a block diagram showing a modification of the fourth embodiment.

The above arrangement is shown in FIG. 15.

Referring to FIG. 15, this arrangement includes a network control unit 131 for controlling interface with an external line 61, a telephone set 132 having the same arrangement as that in FIG. 13, and telephone lines 136 and 137 having the same arrangements as the lines 66 and 67 in FIG. 13.

According to this embodiment as described above, since the facsimile machine 64 is connected to the main control unit 62 through a telephone set for exclusive use which can be connected as standard equipment, a destination facsimile machine can be called (dialed) upon an operation of telephone number keys of the telephone set 101. A telephone set for general use which cannot be connected as standard equipment of the main control unit need not be connected to the facsimile machine 64. A new interface for the telephone set for general us need not be arranged.

The line can be easily switched to facsimile communication upon depression of the start button of the facsimile machine after the destination responds to dialing from the telephone set 101.

If a facsimile machine is of a portable type and is installed on a desk, the telephone set of this embodiment is connected thereto in place of the telephone set for general use. The network control circuit 131 may be arranged in the telephone set of this embodiment. Therefore, the main control unit 62 can be omitted, the apparatus structure can be simplified, and the space can be saved.

The data communication equipment may be connected to a public telephone line and can allow communication upon an operation at the data communication equipment.

According to the fourth embodiment as described above, the facsimile machine can be connected to an extension of the existing telephone control unit without adding a special interface circuit.

A call signal generating circuit (FIG. 1) (i.e., the DC/DC converter A and the polarity inverter B) is arranged in the call signal generating circuit 123 (FIG. 13) of the fourth embodiment to simplify the circuit arrangement. An arrangement obtained by applying the call signal generating circuit (FIG. 1) to the call signal generating circuit 123 (FIG. 13) will be described as a fifth embodiment hereinafter.

Figure 16:
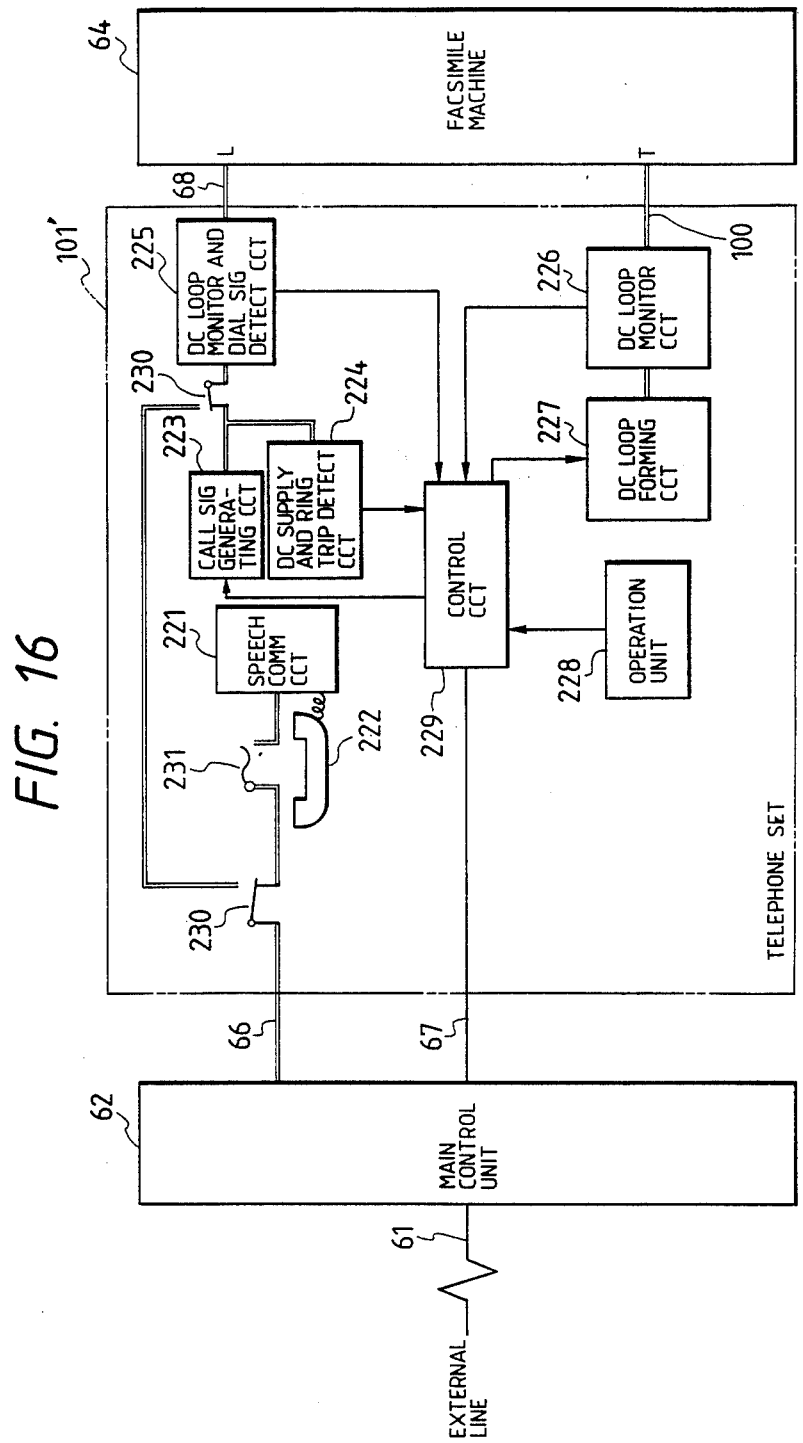
FIG. 16 is a block diagram showing an arrangement of a telephone set for exclusive use according to a fifth embodiment of the present invention.

A detailed arrangement of a telephone set 101' for exclusive purpose according to the fifth embodiment is shown in FIG. 16.

Referring to FIG. 16, a speech communication circuit 221 performs impedance matching with a line 66. The speech communication circuit 221 sends out a speech signal or the like from a handset 222 onto the line 66 and at the same time outputs a speech signal from the line 66 to the handset 222.

The call signal generating circuit 223 (the DC/DC converter A and the polarity inverter B) shown in FIG. 1 is a circuit for outputting a call signal to a facsimile machine 64 in the facsimile communication incoming mode and will be described in more detail later. A DC supply and ring trip detect circuit 224 includes a DC supply circuit and a ring trip detect circuit. The DC supply circuit monitors formation of a DC loop upon starting of the facsimile machine. The ring trip detect circuit detects the response of the facsimile machine in response to the call signal. A DC loop monitor and dial signal detect circuit 225 monitors formation of a DC loop with a line 68 during facsimile communication including automatic transmission of the facsimile machine 64 and detects a dial signal.

The DC loop monitor circuit 226 detects that formation of a DC loop with the line 68 by a DC loop forming circuit 227 is switched to loop formation by the facsimile machine itself. An operation unit 228 includes telephone number keys and a selection key for connecting the facsimile machine 64 to the line 66. A control circuit 229 controls the overall operation of the telephone set in accordance with key inputs from the operation unit 228 and a control signal from a control line 67.

A relay circuit 230 switches the line 66 to the speech communication circuit 221 (the telephone set is used to have an original telephone function) or to the facsimile machine 64. A hook switch 231 is interlocked with the on-/off-hook state of the handset 222. The control circuit 229 can also monitor the state of the hook switch 231.

With the above arrangement, the control circuit 229 performs the procedures shown in FIG. 9 and sends the call signal shown in FIG. 2(b) to the facsimile machine 64. In the fifth embodiment, facsimile transmission after manual calling with the telephone set 101' for exclusive use is the same as that in the fourth embodiment.

The frequency and voltage of the call signal can be variably set by software in the fifth embodiment in the same manner as in the second embodiment.

Facsimile reception control will be described with reference to a flow chart of FIG. 17 wherein the telephone set 101' for exclusive use is set in a facsimile automatic receive mode and the facsimile machine 64 is set in the automatic receive mode.

In step S121, a call signal from a center exchanger reaches the external line 61. The main control unit 62 detects this call signal and informs reception of the call signal to the control circuit 229 of the exclusive phone 101' or telephone set for exclusive use through the control line 67 (step S122). In step 123, the control circuit 229 performs the procedures shown in FIG. 9, drives the call signal generating circuit 223, and sends the call signal to the facsimile machine 64 through the line 68. In step S124, the control circuit 229 monitors the DC loop monitor circuit 225 and waits until the response from the facsimile machine 64 is received. When the facsimile machine 64 detects the call signal and forms a loop with the line 68, the DC loop monitor circuit 225 detects the DC loop and sends a DC loop detection signal to the control circuit 229. In step S125, the control circuit 229 operates the relay circuit 230 to connect the lines 66 and 68. At the same time, the control circuit 229 informs the main control unit 62 of the response from the facsimile machine 64. In step 126, the main control unit 62 receives the information signal from the telephone set 101', responds to the call signal from the center exchanger to the external line 61, and connects the external line 61 and the line 66. In step S127, the center exchanger stops generating the call signal in response to a signal from the main control unit 62 and connects the external or exit line 1 to the call source line, i.e., the calling station, thereby forming a communication path between the source facsimile machine and the destination facsimile machine. In step S128, necessary facsimile communication is performed. When facsimile communication is ended, the facsimile machine 64 releases the DC loop formed with the line 68 so as to release the line. Thereafter, the flow advances to step S10 in FIG. 14, and the line is recovered through the same processing as the manual send operation.

In the above description, the line 66 is normally connected to the speech communication circuit 221 through the hook switch 231. Under this condition, manual calling and facsimile transmission with the exclusive telephone set are performed. In addition, the exclusive telephone set is set in the facsimile automatic receive mode. Under this condition, the automatic receive mode of the facsimile machine has been described. However, the present invention is not limited to the particular modes of operation described above. The lines 66 and 68 may be normally connected and the line 66 may be connected to the facsimile machine 64. Under these conditions, the facsimile machine 64 may be set in the automatic receive/send mode.

Manual/automatic transmission/reception may be performed even if a facsimile machine without a T terminal to which the DC loop forming line 100 cannot be connected is used.

According to the fifth embodiment as has been described above, without degrading the convenient function of a telephone set for exclusive use in a key telephone system, the telephone set can be connected to the facsimile machine. Furthermore, since the call signal generating circuit is made compact, a telephone set for exclusive use connected to the facsimile machine can be made compact accordingly.

In each embodiment described above, the facsimile machine is exemplified as a data communication apparatus. However, any communication apparatus such as a telex or teletex having an automatic start mode set in response to a call signal from a line can be used in the present invention.

The present invention is not limited to the particular embodiments described above. Various changes and modifications may be made within the spirit and scope of the invention.

What is claimed is:

1. A call signal generating circuit comprising:
   a DC/DC converter;
   ON/OFF control means for ON/OFF-controlling an output voltage from said DC/DC converter; and
   polarity switching means for switching polarities of an ON/OFF-controlled voltage.

2. A circuit according to claim 1, wherein an ON/OFF timing of said ON/OFF control means and a polarity switching timing of said polarity switching means are adjusted to generate a call signal having an arbitrary frequency.

3. A circuit according to claim 2, further including means for regulating a voltage of the call signal.

4. A communication apparatus comprising:
   means for connecting a line to a data communication unit;
   means for generating a call signal for starting the data communication unit;
   means for detecting a response of the data communication unit in response to the call signal; and
   control means for interrupting generation of the call signal and causing said connecting means to connect the line to the data communication unit on the basis of an output signal from said detecting means, wherein said call signal generating means comprises a DC/DC converter;
   ON/OFF control means for ON/OFF-controlling an output voltage from said DC/DC converter; and
   polarity switching means for switching polarities of an ON/OFF-controlled voltage.

5. An apparatus according to claim 4, wherein said control means outputs a control signal for operating said ON/OFF control means and said polarity switching means and causes generation of the call signal in accordance with the control signal.

6. An apparatus according to claim 5, wherein the control signal has a variable output timing, and said control means arbitrarily changes a frequency of the call signal by changing the output timing of the control signal.

7. An apparatus according to claim 4, wherein the data communication unit is a facsimile machine having an automatic receive mode.

8. An apparatus according to claim 4, further including means for designating switching of the line to the data communication unit, and said control means operates said call signal generating means on the basis of designation by said designating means.

9. An apparatus according to claim 4, further including speech communicating means for performing speech communication.

10. A communication apparatus comprising:
    means for connecting a line to a data communication unit;
    means for generating a call signal for starting the data communication unit,
    wherein said call signal generating means generates the call signal while a ground level is being insulated,
    means for detecting a response of the data communication unit in response to the call signal; and
    control means for interrupting generation of the call signal and causing said connecting means to connect the line to the data communication unit on the basis of a detection signal from said detecting means.

11. An apparatus according to claim 10, wherein the call signal is sent to the data communication unit through a signal line different from a signal line for connecting the line to the data communication unit.

12. An apparatus according to claim 10, further including means for designating switching of the line to the data communication unit, and said control means operates said call signal generating means on the basis of designation by said designating means.

13. An apparatus according to claim 10, wherein said detecting means detects a DC loop with a signal line for connecting said communication apparatus and the data communication unit.

14. An apparatus according to claim 10, wherein the data communication unit is a facsimile machine having an automatic receive mode.

15. A communication apparatus comprising:
    means for connecting a line to a data communication unit;
    key input means for inputting dial data of a destination;
    means for sending a dial signal corresponding to a key input by said key input means;
    means for storing an accessory telephone set connecting line of the data communication unit and forming a DC loop of the accessory telephone set connecting line;
    means for sending the call signal to the data communication unit;
    means for detecting a response of the data communication unit received in response to the call signal from said call signal sending means; and
    control means for causing said connecting means to connect the line to the data communication unit on the basis of a detection signal from said response detecting means.

16. An apparatus according to claim 15, further comprising dial response detecting means for detecting whether a dialed destination responded upon sending of the dial signal from said sending means, and wherein said DC loop forming means forms the DC loop upon detection by said dial response detecting means.

17. An apparatus according to claim 16, further including means for designating connection of the line to the data communication unit, and wherein said call signal sending means sends the call signal on the basis of designation by said designating means.

18. An apparatus according to claim 17, wherein when the response of the data communication unit received in response to the call signal is detected, sending of the call signal is stopped.

19. An apparatus according to claim 15, wherein said call signal sending means includes a DC/DC converter, ON/OFF control means for ON/OFF-controlling an output voltage from said DC/DC converter, and polarity switching means for switching polarities of an ON/OFF-controlled voltage.

20. An apparatus according to claim 15, further including means for detecting an incoming call from the line, and wherein said call signal sending means sends the call signal to the data communication unit upon detection by said incoming call detecting means.

21. An apparatus according to claim 19, wherein operation timings of said ON/OFF control means and said polarity switching means are changed to change a frequency of the call signal.

22. An apparatus according to claim 15, wherein the data communication unit is a facsimile machine having a automatic receive mode.

* * * * *

UNITED STATES PATENT AND TRADEMARK OFFICE
CERTIFICATE OF CORRECTION

PATENT NO. : 4,942,600
DATED : July 17, 1990
INVENTOR(S) : SHOJI SUZUKI

It is certified that error appears in the above-identified patent and that said Letters Patent is hereby corrected as shown below:

COLUMN 9

Line 18, "unit 76!" should read --unit 76'--.
    Line 57, "contacts" should read --contacts.--.

COLUMN 11

Line 15, "a" should read --an--.
    Line 67, "candepress" should read --can depress--.

COLUMN 13

Line 13, "us" should read --use--.

COLUMN 18

Line 17, "a" should read --an--.

Signed and Sealed this

Fifth Day of May, 1992

Attest:

DOUGLAS B. COMER

*Attesting Officer*      *Acting Commissioner of Patents and Trademarks*